Patented Aug. 18, 1953

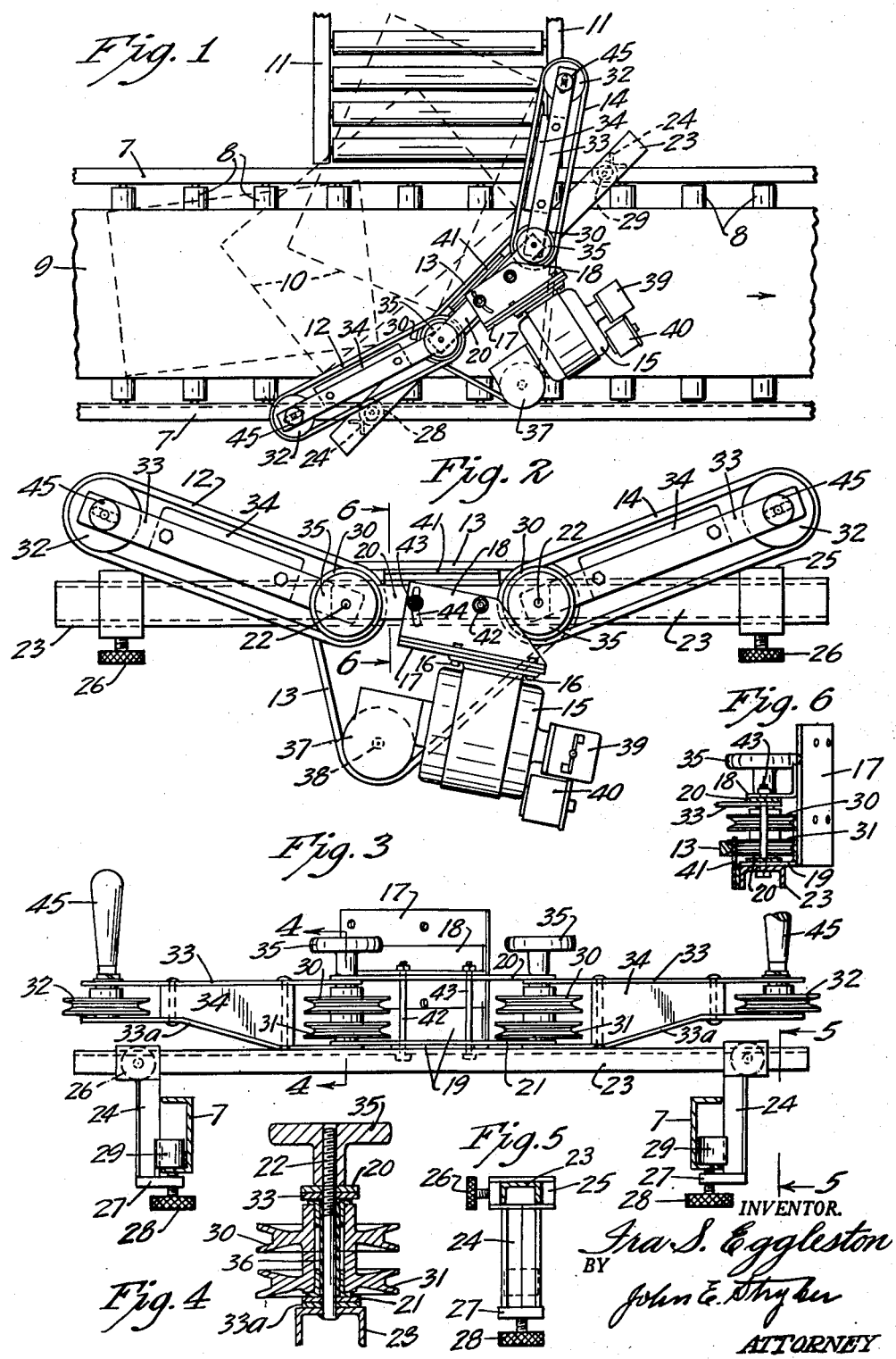

2,649,187

UNITED STATES PATENT OFFICE 2,649,187

POWER-DRIVEN DIVERTER ATTACHMENT
FOR CONVEYERS

Ira Smith Eggleston, St. Paul, Minn., assignor to
Standard Conveyor Company, North St. Paul,
Minn., a corporation of Minnesota Application June 20, 1949, Serial No. 100,180

6 Claims. (Cl. 198—185)

1

This invention relates to a power-driven diverter adapted to be attached to conveyors of various types for positively discharging or diverting load units from a main conveyor or for feeding such units to a branch conveyor disposed at either side and at any desired angle to the main conveyor.

It is an object of my invention to provide a compact, readily portable diverter of the class described adapted to be attached to conveyors of common types at any station where it may be desirable to divert load units.

A particular object is to provide a diverter of the class described comprising a plurality of driven belts or endless diverter units having load engaging reaches adapted to extend obliquely across and above the load supporting surface of a conveyor to actuate load units transversely of their direction of travel on the conveyor and to start the units along a branch or connecting conveyor extending either at a right angle or oblique angle to the first mentioned conveyor.

A further and particular object is to provide driven diverter belts adapted to be operated at various angles to the direction of travel of load units on a main conveyor and to increase the speed of the units as they are diverted to a branch conveyor so that the momentum of the units is not depended on to feed a branch conveyor which may extend at a right angle or even greater reverse angle relative to the direction of travel on the main conveyor.

My invention also includes certain other novel features of construction which will be more fully pointed out in the following specification and claims.

Referring to the accompanying drawing which illustrates, by way of example and not for the purpose of limitation, a preferred embodiment of my invention:

Figure 1 is a plan view of one of my improved diverters mounted on a conveyor of common type;

Fig. 2 is a plan view showing the diverter separate from the conveyor and on a somewhat larger scale than the illustration in Fig. 1;

Fig. 3 is a front side elevational view of the supporting and guiding elements with the belts and motor removed;

Fig. 4 is a vertical sectional view taken on the line 4—4 of Fig. 3;

Fig. 5 is a section taken on the line 5—5 of Fig. 3, and

Fig. 6 is a fragmentary section taken on the line 6—6 of Fig. 2.

2

In Fig. 1 my diverter is shown in connection with a main conveyor of common type having a pair of side rails 7 and a multiplicity of rollers 8 mounted between the rails 7 to support an endless conveyor belt 9 which is power-driven to carry load units 10 along a determined path. It will be evident that the rollers 8 and belt 9 define a load supporting surface. In this illustration my diverter is arranged to direct a succession of the units 10 to a roller conveyor 11 which extends at right angles to the direction of travel of the belt 9.

My principal diverter units comprise endless belts 12, 13 and 14 which are arranged with load engaging reaches severally extending at selected angles across and above the main conveyor. These belts are driven in the appropriate direction by suitable connections with an electric motor 15 which is secured by bolts 16 to a vertically extending plate 17. Horizontally disposed bracket members 18 and 19 support the motor and plate 17 on horizontally extending bars 20 and 21 arranged one above the other. These bars are perforated to receive vertically extending shafts 22, the lower ends of which are rigidly secured to a channel bar 23 constituting the main frame member for supporting the diverter on a conveyor.

Depending from the bar 23 near each end thereof is a supporting member 24 of angle shape in cross section and rigidly secured to the upper end of each of the members 24 is a clamp head 25 which slidably fits the bar 23 and is adapted to be secured thereto in adjusted positions by means of a set screw 26. Projecting laterally from the lower end of each of the members 24 is a clamp member 27 which carries a set screw 28 for engagement with the bottom surface of one of the rails 7. Also rigidly secured to each member 24 is a cylindrical member 29 which is spaced upward from the member 27 to rest on a flange of the rail 7 so that the flange may be clamped between the members 27 and 29 by the set screw 28.

Each of the vertically extending shafts 22 has revolubly mounted thereon pulleys 30 and 31 which are secured together for rotation in unison. The pulleys 30 are at a common elevation with pulleys 32 carried respectively by the outer ends of arms 33. Each arm 33 has upper and lower spaced members which are rigidly connected together by vertically extending rivets and spaced apart by a block 34, the lower arm member being indicated at 33a. As best shown in Fig. 4, the upper end portion of each shaft 22 has a threaded connection with a hand wheel 35 which is adapted to be manipulated to fasten the arm 33 in adjusted angular positions relative to the bar 23. A sleeve 36 extends along the shaft 22 to space the arm 33 and bar 20 at the upper end of the sleeve from the bar 19 and arm member 33a at the lower end thereof. This sleeve prevents the clamping pressure employed in securing the arms in selected positions from being applied to the pulleys 30 and 31.

To drive the belt 13, it is trained on a pulley 37 which is fixed on the lower end of a power-driven shaft 38 and the latter is operatively connected, through suitable speed reducing gearing, to the electric motor 15. This motor is preferably of the reversible type and is under control of a reversing switch 39 and a stop and start switch 40. The belt 12 is trained on the pulleys 30 and 32 and extends along one of the arms 33 and the belt 14 is similarly supported, being trained on the other pair of pulleys 30 and 32 to extend along the opposite arm 33. As further shown in Fig. 2, the belt 13 is trained on both of the pulleys 31 and on the driving pulley 37 so that the several belts operate in unison with their front reaches extending obliquely across the main conveyor and at various selected angles respectively. These reaches of the belts are engaged by the load units 10 and operate to turn and divert the units to the branch conveyor 11 when arranged as shown in Fig. 1. To support the front reach of the belt 13, a vertically extending plate 41 is provided, this plate being rigidly secured to and arranged to project upwardly from one side of the bar 23. The blocks 34 project from the arms 33 to slidably support the front reaches of the belts 12 and 14.

Tension of the belt 13 may be adjusted by adjusting the position of the motor bracket members 18 and 19 relative to the bar 23. For this purpose the bracket members are pivoted on a vertically extending bolt 42 and a second bolt 43 extends through an arcuate slot 44 formed in each of the bracket members 18 and 19. The bolt 43 thus is operative to clamp the motor assembly including the driving pulley 37 in adjusted positions. Movement of the arms 33 to various angular positions is facilitated by providing handles 45 which project upward from the axial shafts upon which the pulleys 32 rotate.

The bar 23 may be secured at an angle of approximately 45 degrees to the direction of travel of the load units 10 along the main conveyor. This bar is adapted to be fastened to conveyors having side rails 7 spaced variously, the necessary adjustment being afforded by the clamping heads 25 which are slidable along the bar 23. For best results it has been found that the diverter belts 12, 13 and 14 should be driven at a substantially higher lineal speed than that of the load units along the main conveyor. Ordinarily the main conveyors are designed to move the load units carried thereby at a rate of from 100 to 125 feet per minute and for use with such conveyors I prefer to operate the belts 12, 13 and 14 at lineal speeds of from 250 to 300 feet per minute. This causes the load units to be turned quickly and fed with increased velocity to the branch conveyor thereby insuring the proper feeding of the branch conveyor and overcoming the inertia of the load units. Selected successive positions of a load unit in its movement from the main conveyor to the branch conveyor are indicated in broken lines in Fig. 1.

After merely loosening the hand wheels 35 on the vertical pivot shafts 22 the arms 33 may be moved to any desired angle relative to the bar 23 and front reach of the belt 13 and upon tightening the hand wheels 35, the arms 33 are held in the adjusted position. By reversing the direction of operation of the belts, loads may be transferred from the branch conveyor to the main conveyor.

The present device is adapted for use with conveyors handling many different types of load units such as cartons, boxes, crates, cases, etc., of various shapes and sizes, containing goods of various kinds and of various weights. Such load units are successively diverted irrespective of whether the several units are spaced apart or in contact one with another on the main conveyor. It is sometimes desirable to provide the belts 12, 13 and 14 with ribbed or corrugated or otherwise roughened outer surfaces adapted to positively engage the vertical corners of the load units. The branch conveyors to which the load units are to be transferred may be disposed at various angles relative to the main conveyor ranging through about 30 degrees to either side of the right angle, or fanning out at any angle within the range 60 degrees to 120 degrees. This is made possible by my arrangement for changing the relative angles of the several belts 12, 13 and 14 and position of the frame member 23 relative to the conveyor on which it is mounted.

My diverter has the further advantage of being adapted for use with main and branch conveyors of various common types such as gravity roller conveyors, live roller conveyors and belt conveyors. As compared with many common types of diverters, the present device saves space and is readily attachable at any station where it is desired to divert the load units.

Having described my invention, what I claim as new and desire to protect by Letters Patent is:

1. For a conveyor adapted to carry load units along a determined path and having side rails and members defining a load supporting surface, an attachment comprising a frame adapted to extend across said surface, means for detachably connecting said frame to said rails, a motor carried by said frame and a plurality of endless diverter units operatively connected to said motor and having load engaging reaches disposed at an angle and substantially in continuation one relative to another obliquely across said path above said surface.

2. For a conveyor adapted to carry load units along a determined path at a predetermined speed and having side rails and members defining a load supporting surface, an attachment comprising a frame, means for detachably connecting said frame to said rails, a plurality of endless diverter units having load engaging reaches disposed at an angle and substantially in continuation one relative to another obliquely across said path above said surface, a motor carried by said frame and means so connecting said motor to said diverter units as to operate them at a higher speed.

3. For a conveyor adapted to carry load units along a determined path and having members defining a load supporting surface, an attachment comprising a frame adapted to extend across said surface, means for detachably connecting said frame to said rails, a motor carried by said frame and a plurality of endless diverter belts operatively connected to said motor and having side rails and load engaging reaches disposed at an angle and substantially in continuation one relative to another obliquely across said path above said surface, supporting and guiding means for one of said belts adapted to be secured in selected angular positions crosswise of said path.

4. For a conveyor adapted to carry load units along a determined path and having side rails and load supporting members carried by said rails and defining a load supporting surface, a frame adapted to be supported on said rails and to extend across and above said surface, means for detachably connecting said frame to said rails, an electric motor carried by said frame, an endless diverter unit operatively connected to said motor and having a load engaging reach adapted to extend obliquely across said path for engagement with load units carried by said conveyor, a substantially horizontally extending arm pivotally connected at one end to said frame and carrying a guide for a second diverter unit, a second endless diverter unit trained on said guide and having a reach for engagement with the load units extending at an angle to said reach of the first mentioned diverter unit and means for securing said arm in selected angular positions to adjust the angle of said reach of the second diverter unit relative to said reach of the first mentioned diverter unit.

5. For a conveyor adapted to carry load units along a determined path and having side rails and load supporting members carried by said rails and defining a load supporting surface, a frame adapted to be supported on said rails and to extend across and above said surface, means for detachably connecting said frame to said rails, an electric motor carried by said frame, an endless belt connected to said motor for operation in a substantially horizontal plane and having a load engaging reach adapted to extend obliquely across said path for engagement with load units carried by said conveyor, a substantially horizontally extending arm connected at one end to said frame member and carrying a guide pulley for a second belt, a second belt trained on said pulley and having a substantially horizontally movable reach for engagement with the load units and extending at an angle to said reach of the first mentioned belt and means for securing said arm in selected angular positions to adjust the angle of said reach of the second belt relative to said reach of the first mentioned belt.

6. For a conveyor adapted to carry load units along a determined path and having side rails and load supporting members carried by said rails and defining a load supporting surface, a frame adapted to be supported on said rails and to extend obliquely across and above said surface, means for detachably connecting said frame to said rails, an electric motor carried by said frame, a pair of substantially vertically disposed shafts carried by said frame, a pair of pulleys revolubly mounted on each of said shafts, an endless belt operatively connected to said motor, trained on selected pulleys mounted on the several vertical shafts and having a load engaging reach adapted to extend obliquely across said path for engagement with load units carried by said conveyor, substantially horizontally disposed arms extending from said shafts respectively, a guide pulley carried by each of said arms, diverter belts severally supported and guided on selected pulleys mounted on said shafts and on the pulleys carried by said arms respectively, each of said diverter belts having a reach for engagement with the load units extending at an angle to said reach of the first mentioned belt and means for securing said arms in selected angular positions to adjust the angles of said arms respectively relative to said reach of the first mentioned belt.

IRA SMITH EGGLESTON.

References Cited in the file of this patent

UNITED STATES PATENTS

| Number | Name | Date |
|---|---|---|
| 1,716,968 | May | June 11, 1929 |
| 1,849,045 | Wolf | Mar. 8, 1932 |
| 1,982,824 | Miltenberger | Dec. 4, 1934 |
| 2,222,514 | O'Brien et al. | Nov. 19, 1940 |
| 2,233,850 | Rapley | Mar. 4, 1941 |
| 2,242,531 | Marx | May 20, 1941 |
| 2,549,370 | Ernst | Apr. 17, 1951 |